(12) United States Patent
Hunt et al.

(10) Patent No.: US 11,533,847 B2
(45) Date of Patent: Dec. 27, 2022

(54) CONTROL OF A HEADER OF A HARVESTER DURING A NON-HARVESTING MODE

(71) Applicant: CNH Industrial America LLC, New Holland, PA (US)

(72) Inventors: Cory Douglas Hunt, Millersville, PA (US); Jethro Martin, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 513 days.

(21) Appl. No.: 16/724,918

(22) Filed: Dec. 23, 2019

(65) Prior Publication Data

US 2021/0185879 A1    Jun. 24, 2021

(51) Int. Cl.
*A01D 41/14*   (2006.01)
*A01D 75/18*   (2006.01)
*A01D 75/28*   (2006.01)

(52) U.S. Cl.
CPC ......... *A01D 41/141* (2013.01); *A01D 41/144* (2013.01); *A01D 75/185* (2013.01); *A01D 75/28* (2013.01)

(58) Field of Classification Search
CPC .... A01B 73/00; A01D 41/144; A01D 41/145; A01D 41/141; A01D 75/18; A01D 75/28; A01D 75/287; A01D 75/185; A01D 75/002; A01D 75/004
See application file for complete search history.

(56) References Cited

U.S. PATENT DOCUMENTS

| | | | |
|---|---|---|---|
| 6,516,595 B2* | 2/2003 | Rhody | A01D 41/141 172/4 |
| 6,615,570 B2* | 9/2003 | Beck | A01D 41/141 701/50 |
| 6,826,894 B2* | 12/2004 | Thiemann | A01D 41/141 701/50 |
| 6,871,483 B1* | 3/2005 | Panoushek | A01D 41/141 701/50 |
| 7,540,130 B2 | 6/2009 | Coers et al. | |
| 7,707,811 B1 | 5/2010 | Strosser | |

(Continued)

FOREIGN PATENT DOCUMENTS

| DK | 179365 B1 | 5/2018 |
|---|---|---|
| GB | 1106002 A | 3/1968 |

OTHER PUBLICATIONS

International Search Report and Written Opinion for Application No. PCT/US2020/066394 dated Apr. 20, 2021 (13 pages).

*Primary Examiner* — Adam J Behrens
(74) *Attorney, Agent, or Firm* — Peter K. Zacharias; Patrick Sheldrake

(57) ABSTRACT

An agricultural system includes a header and a controller. The controller is configured to receive an indication to operate the agricultural system in a non-harvesting mode, output a first signal to set the header in a set profile upon initialization of the non-harvesting mode, receive sensor feedback indicative of an obstacle position of an obstacle relative to the header while the agricultural system operates in the non-harvesting mode, and output a second signal to adjust the header to deviate from the set profile based on the sensor feedback while the agricultural system operates in the non-harvesting mode.

20 Claims, 7 Drawing Sheets

(56) References Cited

U.S. PATENT DOCUMENTS

| | | | |
|---|---|---|---|
| 8,706,341 B2 * | 4/2014 | Madsen | A01B 69/001 |
| | | | 382/104 |
| 9,668,412 B2 | 6/2017 | Ritter et al. | |
| 9,807,933 B2 * | 11/2017 | Boyd | A01D 41/127 |
| 10,159,182 B2 | 12/2018 | Berggren | |
| 11,122,740 B2 * | 9/2021 | Middelberg | A01D 69/03 |
| 2003/0145571 A1 * | 8/2003 | Diekhans | A01D 43/073 |
| | | | 56/10.2 R |
| 2015/0033692 A1 | 2/2015 | Schroeder et al. | |
| 2017/0088132 A1 * | 3/2017 | Sagemueller | A01D 41/1278 |
| 2018/0084708 A1 * | 3/2018 | Neitemeier | G06K 9/6269 |
| 2019/0053429 A1 | 2/2019 | Cook | |
| 2019/0116731 A1 | 4/2019 | Berggren | |

* cited by examiner

CONTROL OF A HEADER OF A HARVESTER DURING A NON-HARVESTING MODE

BACKGROUND

The present disclosure generally relates to a header for an agricultural system.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A harvester may be used to harvest crops, such as barley, beans, beets, carrots, corn, cotton, flax, oats, potatoes, rye, soybeans, wheat, or other plant crops. During operation of the harvester, the harvesting process may begin by removing a portion of a plant from a field using a header of the harvester. The header may cut the plant and transport the cut crops to a processing system of the harvester. Certain headers include a cutter bar assembly configured to cut a portion of each crop (e.g., a stalk), thereby separating the cut crop from the soil. The cutter bar assembly may extend along a substantial portion of the width of the header at a forward end of the header. The header may also include one or more belts positioned behind the cutter bar assembly relative to the direction of travel of the harvester. The belt(s) are configured to transport the cut crops to an inlet of the processing system.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In certain embodiments, an agricultural system includes a header and a controller. The controller is configured to receive an indication to operate the agricultural system in a non-harvesting mode, output a first signal to set the header in a set profile upon initialization of the non-harvesting mode, receive sensor feedback indicative of an obstacle position of an obstacle relative to the header while the agricultural system operates in the non-harvesting mode, and output a second signal to adjust the header to deviate from the set profile based on the sensor feedback while the agricultural system operates in the non-harvesting mode.

DRAWINGS

These and other features, aspects, and advantages of the present disclosure will become better understood when the following detailed description is read with reference to the accompanying drawings in which like characters represent like parts throughout the drawings, wherein.

Figure 1:
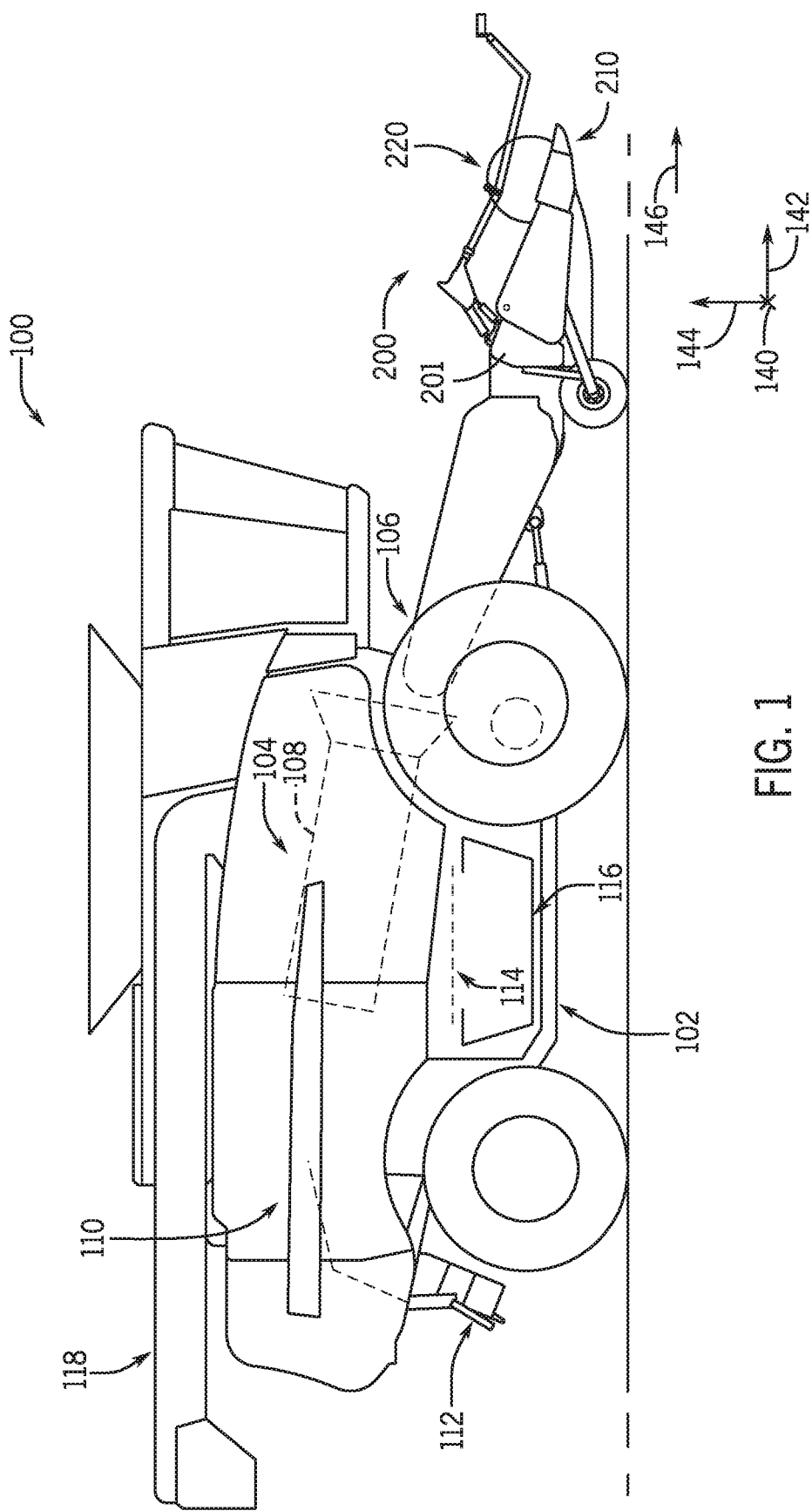
FIG. 1 is a side view of an embodiment of an agricultural system, in accordance with an aspect of the present disclosure.
Figure 6:
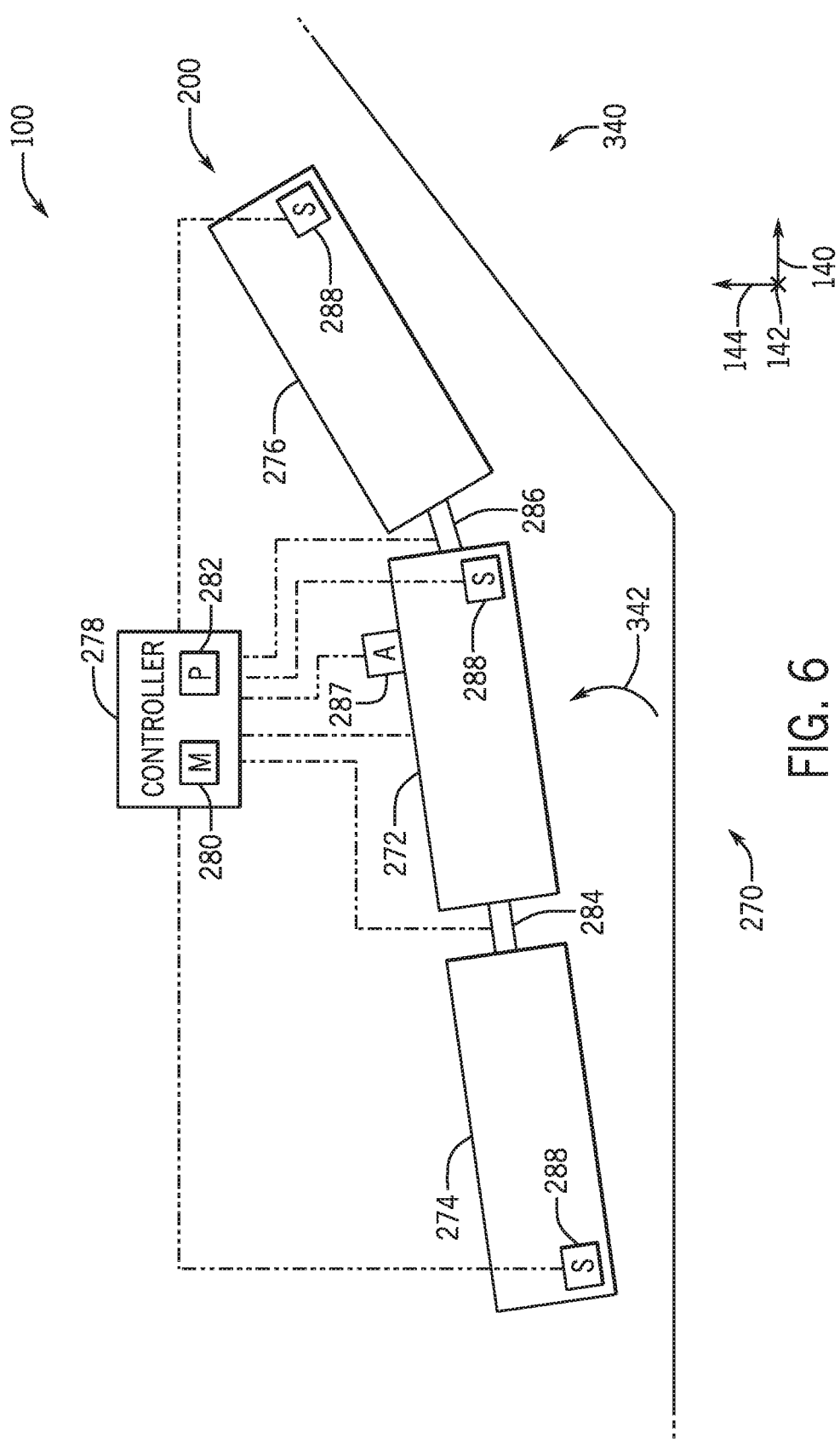
Figure 7:
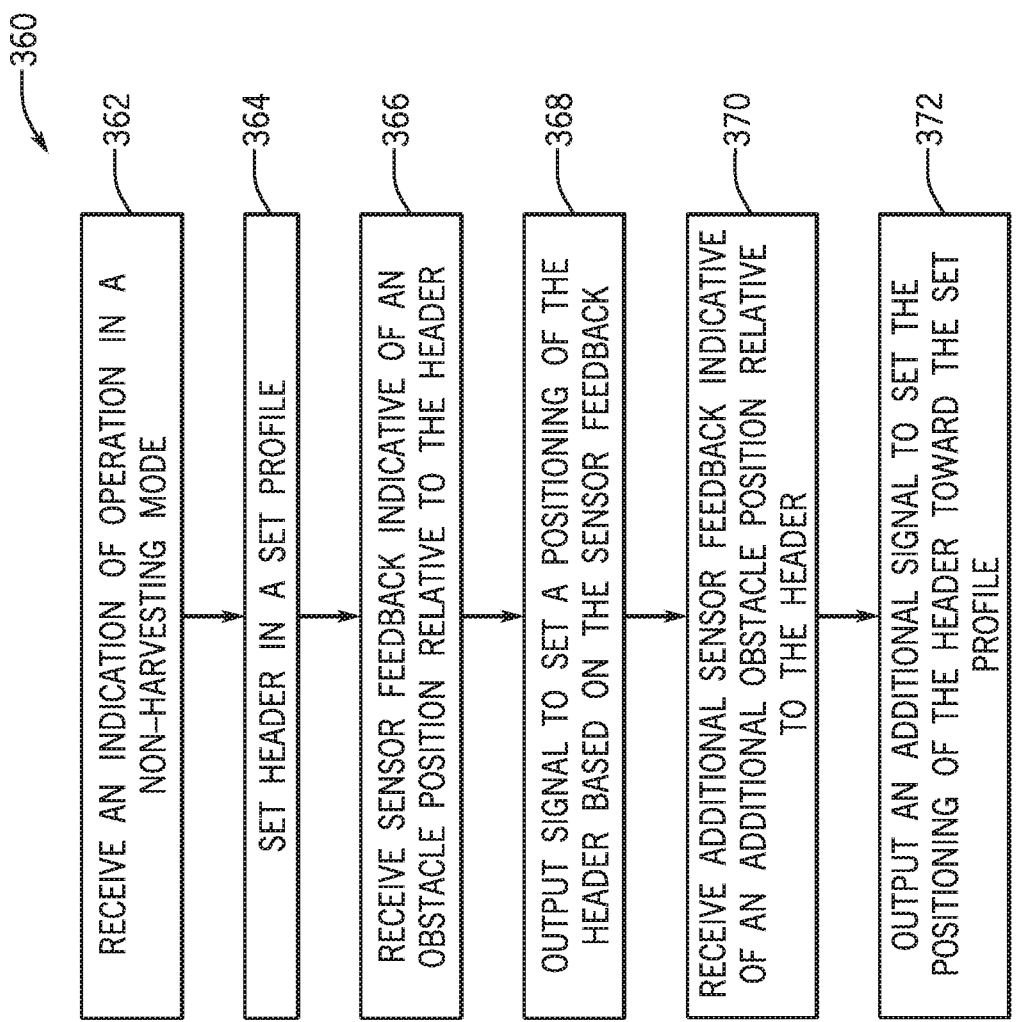

FIG. 6 is a schematic diagram of an embodiment of the agricultural system of FIG. 1 operating in a non-harvesting mode, and in which an entirety of the header has been moved relative to a field, in accordance with an aspect of the present disclosure; and FIG. 7 is a block diagram of an embodiment of a method for operating the agricultural system of FIG. 1 in a non-harvesting mode, in accordance with an aspect of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The process of farming typically begins with planting seeds within a field. Over time, the seeds grow and eventually become harvestable crops. Typically, only a portion of each crop is commercially valuable, so each crop is harvested to separate the usable material from the remainder of the crop. For example, a harvester may cut crops within a field via a header, which may include a flexible draper header. The flexible draper header may include a cutter bar assembly configured to cut the crops. As the cutter bar assembly cuts the crops, a conveyor coupled to draper deck(s) of the header move the crops toward a crop processing system of the harvester. For example, the conveyor on the side draper deck(s) may move the cut crops toward an infeed draper deck at a center of the header. A conveyor on the infeed draper deck may then move the crops toward the processing system. The processing system may include a threshing machine configured to thresh the crops, thereby separating the crops into certain desired agricultural materials, such as grain, and material other than grain (MOG). The desired agricultural materials may be sifted and then accumulated into a tank. When the tank fills to capacity, the materials may be collected from the tank. The MOG may be discarded from the harvester (e.g., via a spreader) by passing through an exit pipe or a spreader to fall down onto the field.

With the foregoing in mind, FIG. 1 is a side view of an embodiment of an agricultural system 100, which may be a harvester. The agricultural system 100 includes a chassis 102 configured to support a header 200 and an agricultural crop processing system 104. As described in greater detail below, the header 200 is configured to cut crops and to transport the cut crops toward an inlet 106 of the agricultural crop processing system 104 for further processing of the cut crops. The agricultural crop processing system 104 receives the cut crops from the header 200 and separates desired crop material from crop residue. For example, the agricultural crop processing system 104 may include a thresher 108 having a cylindrical threshing rotor that transports the crops in a helical flow path through the agricultural system 100. In addition to transporting the crops, the thresher 108 may separate certain desired crop material (e.g., grain) from the crop residue, such as husks and pods, and may enable the desired crop material to flow into a cleaning system 114 (such as sieves) located beneath the thresher 108. The cleaning system 114 may remove debris from the desired crop material and transport the desired crop material to a storage tank 116 within the agricultural system 100. When the storage tank 116 is full, a tractor with a trailer on the back may pull alongside the agricultural system 100. The desired crop material collected in the storage tank 116 may be carried up by an elevator and dumped out of an unloader 118 into the trailer. The crop residue may be transported from the thresher 108 to a crop residue handling system 110, which may process (e.g., chop/shred) and remove the crop residue from the agricultural system 100 via a crop residue spreading system 112 positioned at an aft end of the agricultural system 100. To facilitate discussion, the agricultural system 100 and/or its components may be described with reference to a lateral axis or direction 140, a longitudinal axis or direction 142, and a vertical axis or direction 144. The agricultural system 100 and/or its components may also be described with reference to a direction of travel 146.

As discussed in detail below, the header 200 includes a cutter bar assembly 210 configured to cut the crops within the field. The header 200 also includes a reel assembly 220 configured to engage the crops to prepare the crops to be cut by the cutter bar assembly 210 and/or to urge crops cut by the cutter bar assembly 210 onto a conveyor system that directs the cut crops toward the inlet 106 of the agricultural crop processing system 104. The reel assembly 220 includes a reel having multiple fingers extending from a central framework. The central framework is driven to rotate such that the fingers engage the crops and urge the crops toward the cutter bar assembly 210 and the conveyor system. Additionally, the reel may be supported by multiple arms (e.g., reel arms) that are coupled to a frame 201 of the header 200. Each of the arms may be coupled to the frame 201 via a respective pivot joint. For example, one pivot joint is configured to enable a first arm of the multiple arms to pivot (e.g., about the lateral axis 140) relative to the frame 201, and another pivot joint is configured to enable a second arm of the multiple arms to pivot (e.g., about the lateral axis 140) relative to the frame 201.

Figure 2:
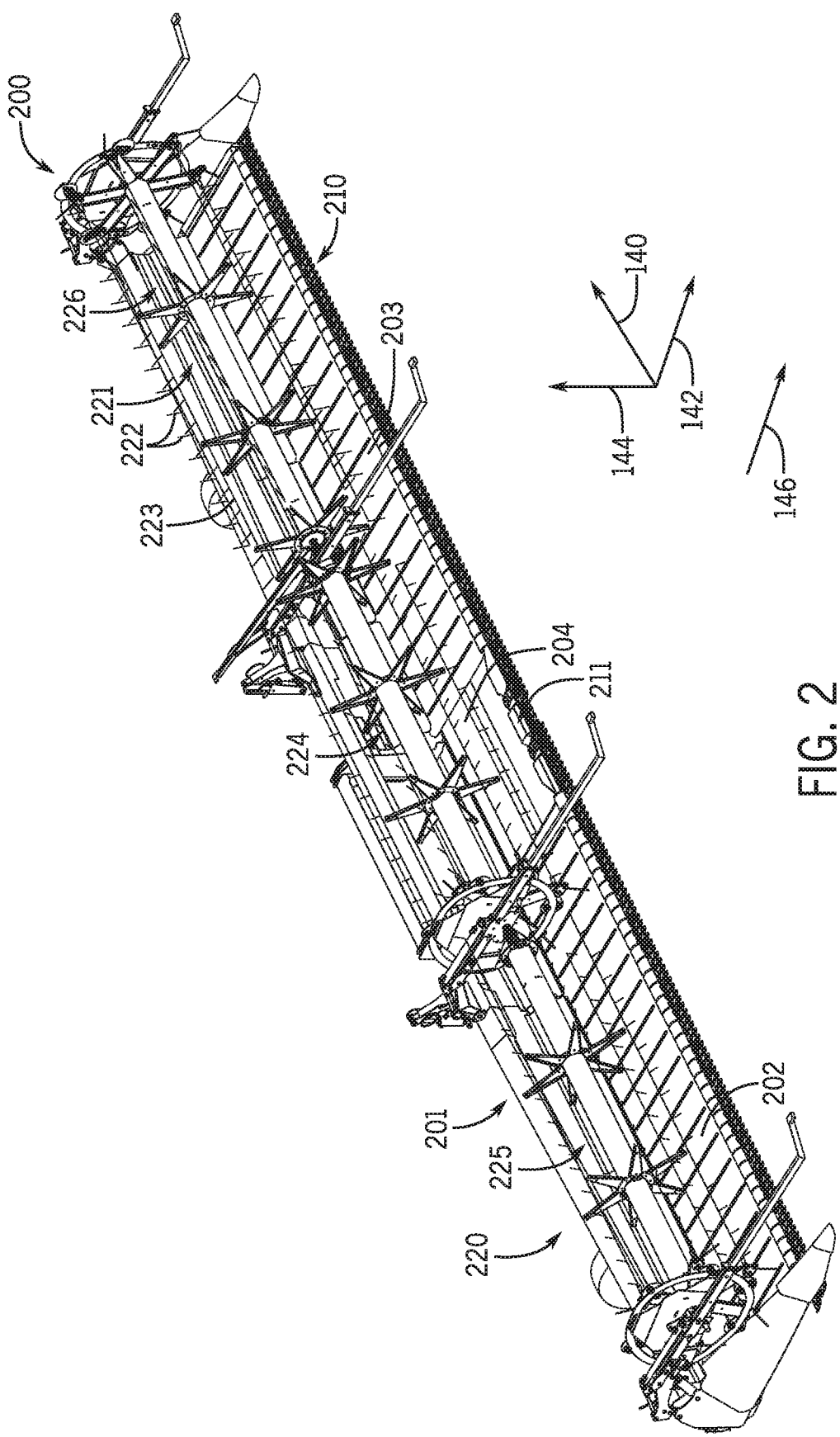
FIG. 2 is a perspective view of an embodiment of a header that may be employed within the agricultural system of FIG. 1, in accordance with an aspect of the present disclosure.

FIG. 2 is a perspective view of an embodiment of the header 200 that may be employed within the agricultural system 100 of FIG. 1. In the illustrated embodiment, the header 200 includes the cutter bar assembly 210 configured to cut a portion of each crop (e.g., a stalk), thereby separating the crop from the soil. The cutter bar assembly 210 is positioned at a forward end of the header 200 relative to the longitudinal axis 142 of the header 200. As illustrated, the cutter bar assembly 210 extends along a substantial portion of the width of the header 200 (e.g., along the lateral axis 140). The cutter bar assembly 210 includes a blade support, a stationary guard assembly, and a moving blade assembly. The moving blade assembly is fixed to the blade support (e.g., above the blade support along the vertical axis 144 of the header 200), and the blade support/moving blade assembly is driven to oscillate relative to the stationary guard assembly. In the illustrated embodiment, the blade support/moving blade assembly is driven to oscillate by a driving mechanism 211 positioned at a center of the header 200. However, in other embodiments, the blade support/moving blade assembly may be driven by another suitable mechanism (e.g., located at any suitable position on the header 200). As the agricultural system 100 is driven through the field, the cutter bar assembly 210 engages crops within the field, and the moving blade assembly cuts the crops (e.g., the stalks of the crops) in response to engagement of the cutter bar assembly 210 with the crops.

In the illustrated embodiment, the header 200 includes a first conveyor section 202 on a first lateral side of the header 200 and a second conveyor section 203 on a second lateral side of the header 200 opposite the first lateral side. The conveyor sections 202, 203 may be separate from one another. For instance, the first conveyor section 202 may extend along a portion of a width of the header 200 and the second conveyor section 203 may extend along another portion of the width of the header 200. Each conveyor section 202, 203 is driven to rotate by a suitable drive mechanism, such as an electric motor or a hydraulic motor. The first conveyor section 202 and the second conveyor section 203 are driven such that a top surface of each conveyor section 202, 203 moves laterally inward to a center conveyor section 204 positioned between the first conveyor section 202 and the second conveyor section 203 along the lateral axis 140. The center conveyor section 204 may also be driven to rotate by a suitable drive mechanism, such as an electric motor or a hydraulic motor. The center conveyor section 204 is driven such that the top surface of the center conveyor section 204 moves rearwardly relative to the direction of travel 146 toward the inlet. As a result, the conveyor sections 202, 203, 204 transport the cut crops through the inlet to the agricultural crop processing system for further processing of the cut crops. Although the illustrated header 200 includes two conveyor sections 202, 203 configured to direct crops toward the center conveyor section 204, there may be any suitable number of conveyor sections in additional or alternative embodiments directing the crops toward the center conveyor section.

In the illustrated embodiment, the crops cut by the cutter bar assembly 210 are directed toward the conveyor sections 202, 203 at least in part by the reel assembly 220, thereby substantially reducing the possibility of the cut crops falling onto the surface of the field. The reel assembly 220 includes a reel 221 having multiple fingers or tines 222 extending from a central framework 223. The central framework 223 is driven to rotate such that the fingers 222 move (e.g., in a circular pattern). The fingers 222 are configured to engage the crops and urge the cut crops toward the conveyor sections 202, 203 to facilitate transportation of the cut crops to the agricultural crop processing system.

As illustrated herein, the cutter bar assembly 210 is flexible along the width of the header 200. As discussed in detail below, the cutter bar assembly 210 is supported by multiple arm assemblies distributed along the width of the header 200. In some embodiments, the frame 201 of the header 200 may be movably coupled to the chassis of the agricultural system. Each arm assembly is mounted to the frame 201 and includes an arm coupled to the cutter bar assembly 210. The arm may rotate and/or move the cutter bar assembly 210 along the vertical axis 144 relative to the frame 201, thereby enabling the cutter bar assembly 210 to flex during operation of the agricultural system. Thus, the cutter bar assembly 210 may follow the contours of the field, thereby enabling the cutting height (e.g., the height at which each crop is cut) to be substantially constant along the width of the header 200. Moreover, certain parts of the header 200 may move relative to one another. For example, the header 200 includes a first section (e.g., center section) 224, a second section 225 extending from a side of the first section 224, and a third section 226 extending from another side of the first section 224. The sections 224, 225, 226 may be movable relative to one another, such as to raise and/or lower the second section 225 and/or the third section 226 relative to the first section 224 in order to enable the cutter bar assembly 210 to follow the contour of the field more acutely.

Figure 3:
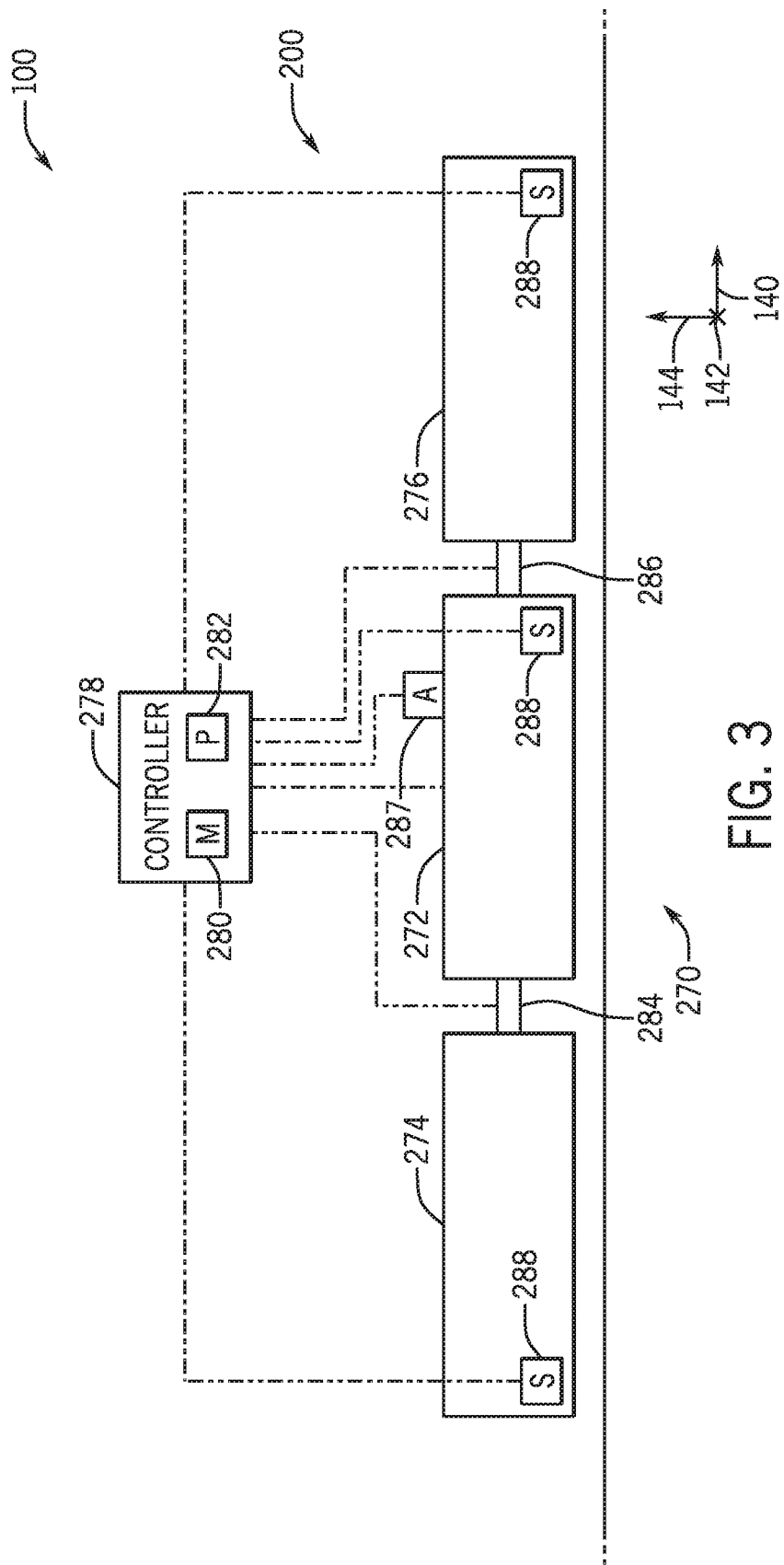
FIG. 3 is a schematic diagram of an embodiment of the agricultural system of FIG. 1 operating in a harvesting mode, in accordance with an aspect of the present disclosure.

FIG. 3 is a schematic diagram of an embodiment of the agricultural system 100 operating in a harvesting mode. In the illustrated embodiment, the agricultural system 100 may be traveling in the direction of travel 146 of FIGS. 1 and 2 along the longitudinal axis 142, and FIG. 3 may represent a front view of the agricultural system 100. In the harvesting mode, the agricultural system may position the header 200 proximate to a field 270. As such, the cutter bar assembly of the header 200 may engage and effectively cut crops on the field 270 to harvest the field 270. The illustrated header 200 includes a center section 272, a first lateral section 274 extending laterally from the center section 272, and a second lateral section 276 extending laterally from the center section 272 opposite the first lateral section 274. The first lateral section 274 and the second lateral section 276 may each be adjustable relative to the center section 272 so as to follow a contour of the field 270, avoid an obstacle, and so forth, and effectively harvest the field 270. For example, any of the lateral sections 274, 276 may be raised or tilted upward in a direction along the vertical axis 144 relative to the center section 272 and/or lowered or tilted downward in the direction along the vertical axis 144 relative to the center section 272. Indeed, the lateral sections 274, 276 may be moved relative to the center section 272 independently of one another to enable the header 200 to harvest the field 270 effectively. Although the illustrated header 200 includes three sections 272, 274, 276, additional or alternative embodiments of the header may have any suitable number of sections, such as two sections, four sections, five or more sections, and so forth, configured to move relative to one another to harvest the field.

In some embodiments, the agricultural system 100 may include a controller 278 (e.g., electronic controller) configured to control various operating parameters of the agricultural system 100, such as of the header 200. The controller 278 may include a memory 280 and a processor 282 (e.g., a microprocessor). The controller 278 may also include one or more storage devices and/or other suitable components. The processor 282 may include multiple microprocessors, one or more "general-purpose" microprocessors, one or more special-purpose microprocessors, and/or one or more application specific integrated circuits (ASICS), or some combination thereof, and the processor 282 may be used to execute software, such as software for controlling the agricultural system 100 and/or the header 200. For example, the processor 282 may include one or more reduced instruction set (RISC) or complex instruction set (CISC) processors. The memory 280 may include a volatile memory, such as random access memory (RAM), and/or a nonvolatile memory, such as read-only memory (ROM). The memory may store a variety of information and may be used for various purposes. For example, the memory 280 may store processor-executable instructions (e.g., firmware or software) for the processor 282 to execute, such as instructions for controlling the agricultural system 100 and/or the header 200. The memory 280 and/or the processor 282, or an additional memory and/or processor, may be located in any suitable portion of the agricultural system 100. By way of example, the controller 278 may be located in a cab of the agricultural system 100 and/or on the header 200. Furthermore, the controller 278 may include or be a distributed controller, the memory 280 may include multiple memories, and the processor 282 may include multiple processors.

The controller 278 may be communicatively coupled to the header 200 so as to move the header 200. In an example, the controller 278 may be configured to move the entirety of the header 200 relative to the field 270. For instance, the controller 278 may be configured to move the center section 272 relative to the field 270 without moving the lateral sections 274, 276 relative to the center section 272. Additionally or alternatively, the controller may tilt the entirety of the header relative to the field. For example, the controller may rotate the center section relative to the field without moving the lateral sections relative to the center section. In another example, the controller 278 may be configured to move the sections 272, 274, 276 relative to one another. To this end, the illustrated header 200 includes a first actuator 284 coupling the center section 272 and the first lateral section 274 together, and the illustrated header 200 includes a second actuator 286 coupling the center section 272 and the second lateral section 276 together. The controller 278 may output control signals to instruct the actuators 284, 286 to move the respective lateral sections 274, 276 relative to the center section 272. By way of example, the controller 278 may output a first control signal to instruct the first actuator 284 to raise or lower the first lateral section 274 relative to the center section 272, and the controller 278 may output a second control signal to instruct the second actuator 286 to raise or lower the second lateral section 276 relative to the center section 272. Indeed, the controller 278 may output the control signals independently of one another such that the actuators 284, 286 may move the respective lateral sections 274, 276 independently of one another. The header 200 may further include a third actuator 287, which may control a position of an entirety of the header 200. For instance, the controller 278 may also output control signals to the third actuator 287 to rotate, raise, and/or lower the entirety of the header 200, raise the entirety of the header 200, in addition to or as an alternative to outputting control signals to the actuators 284, 286 to move the sections 272, 274, 276 relative to one another.

In certain embodiments, the controller 278 may be configured to output control signals to move the header 200 based on sensor feedback. For instance, the illustrated header 200 includes sensors 288 disposed on or proximate to each of the sections 272, 274, 276. Each sensor 288 may be configured to monitor an operating parameter indicative of a distance between a portion of the header 200 (e.g., a portion of one of the sections 272, 274, 276) and the field 270. By way of example, the sensors 288 may include non-contact proximity sensors, such as optical sensors, infrared sensors, and/or light detecting and ranging (LIDAR) sensors, that may determine a position of the header 200 relative to the field 270 without contacting the field 270. As an example, the sensors 288 may be coupled to the header 200, such as on the frame, on a portion of the cutter bar assembly, on a portion of the reel assembly (e.g., the reel arm). The sensors 288 may determine a distance spanning between the field 270 and the header 200 (e.g., of the cutter bar assembly) to determine the position of the header 200 relative to the field 270. In additional or alternative embodiments, the sensors may include contact sensors, such as flex sensors and/or pressure sensors, that determine a position of the header relative to the field by contacting the field. By way of example, the contact sensors may bend or flex due to a force exerted by the field onto the contact sensors based on the position of the header relative to the field. Additionally or alternatively, the contact sensors may determine an amount of the force exerted by the field onto the contact sensors, an amount of bending or flexing of a part of the header, or another suitable operating parameter indicative of the position of the header relative to the field.

In any case, each sensor 288 may be communicatively coupled to the controller 278 and may transmit sensor feedback to the controller 278. The sensor feedback may indicate a reading of the distance between a corresponding portion of the header 200 and the field 270, and the controller 278 may operate the header 200 based on the received sensor feedback in the harvesting mode. As an example, in the harvesting mode, the controller 278 may set a position of the header 200 relative to the field 270 and/or may set a position of the sections 272, 274, 276 relative to one another based on the received sensor feedback to enable the agricultural system 100 to harvest the field 270 more effectively in the harvesting mode. Although the illustrated header 200 includes a single sensor 288 positioned at each section 272, 274, 276, in additional or alternative embodiments, the header may have any suitable number of sensors (e.g., one, two, three, four or more) positioned at any part of the sections of the header or the agricultural system.

In an additional or an alternative embodiment, the controller may be configured to output control signals to move the header in response to receiving an input. The input may be a user input transmitted by an operator of the agricultural system, such as via a user interface, and the user input may indicate a target position of the header, such as a position of the header relative to the field and/or a desirable orientation of the sections of the header relative to one another. Thus, the operator may manually select which lateral sections to move relative to the center section and/or the extent to which the lateral sections move relative to the center section. In further embodiments, the controller may be pre-programmed to output control signals to move the header, such as at particular times during operation of the agricultural system. That is, for example, the agricultural system may have an autoguidance configured to automatically operate components of the agricultural system in accordance with a pre-programmed operation (e.g., as set by the operator), which may include parameters related to when and how the header is positioned and/or oriented. Accordingly, the controller may automatically output the control signals with or without having received sensor feedback and/or a user input.

Figure 4:
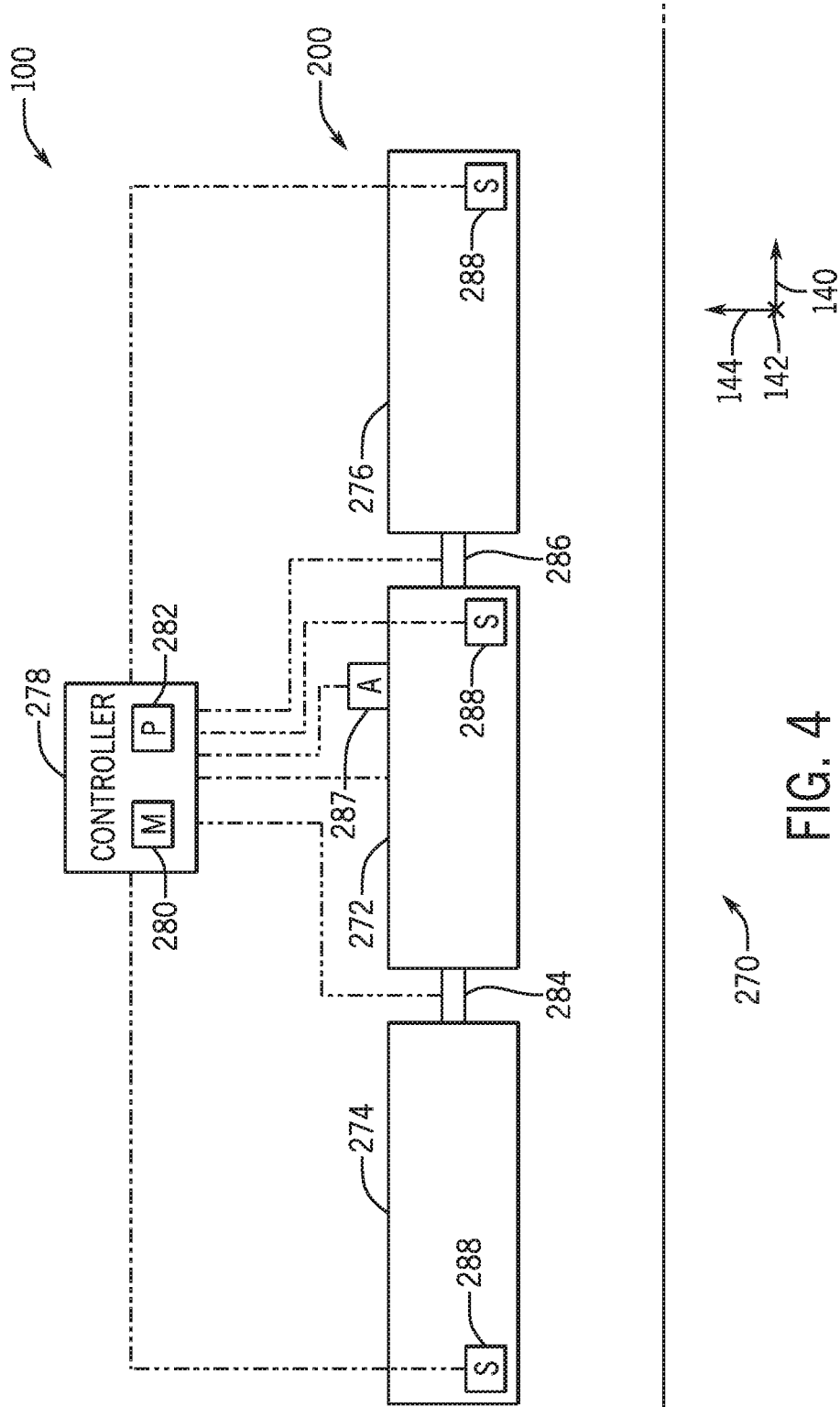
FIG. 4 is a schematic diagram of an embodiment of the agricultural system of FIG. 1 operating in a non-harvesting mode, in accordance with an aspect of the present disclosure.

FIG. 4 is a schematic diagram of an embodiment of the agricultural system 100 operating in a non-harvesting mode. As used herein, the non-harvesting mode refers to a mode in which it is not desired for the header 200 to engage and harvest the crops. For example, the components of the header 200 may be functioning (e.g., the reel of the reel assembly is rotating, the moving blade assembly of the cutter bar assembly is oscillating), but the header 200 is not positioned to engage the field 270 and cut the crops. As an example, the controller 278 may operate the agricultural system 100 in the non-harvesting mode while the agricultural system 100 is making a turn on the field 270 to transition between swaths or paths in which the agricultural system 100 cuts crops, but it may not be desirable for the agricultural system 100 to cut crops while making the turn. Additionally or alternatively, the controller may operate the agricultural system in the non-harvesting mode while the agricultural system is being transported, such as to position the agricultural system in preparation for engagement of a swath, and/or while the agricultural system is parked or stopped, such as for performing inspection or maintenance. In any case, during the non-harvesting mode, the controller 278 may output a signal to instruct the header 200 to be positioned so as to reduce a likelihood of the header 200 undesirably coming into contact with the field 270, thereby avoiding undesirable engagement between the header 200 and the field 270.

During the non-harvesting mode (e.g., in response to entering the non-harvesting mode, such as via a user input), the controller 278 may output control signals to the third actuator 287 to raise the entirety of the header 200 relative to the chassis of the agricultural system 100, thereby moving the header 200 away from the field 270. Thus, in the harvesting mode, the header 200 may be at a lowered position (e.g., a harvesting position to engage and harvest the field 270) and, in the non-harvesting mode, the header 200 may be at a raised position (e.g., a non-harvesting position that is clear of the field 270 to avoid harvesting the field 270). Furthermore, the controller 278 may output control signals to level the header 200 in the non-harvesting mode (e.g., in response to entering the non-harvesting mode). In other words, the controller 278 may output control signals to the actuators 284, 286 to move the lateral sections 274, 276 relative to the center section 272 such that an orientation of the header 200 is substantially flat (e.g., a longitudinal central axes of each section are aligned along or are parallel with the lateral axis 140). In additional or alternative embodiments, it may be desirable for the header to be oriented differently in the non-harvesting mode, such as to have a U-shape profile in which the laterally-outer ends of the lateral sections 274, 276 are positioned further from the field 270 relative to the laterally-inner ends of the lateral sections 274, 276 and the center section 272. Thus, the header 200 may have a particular appearance in the non-harvesting mode while limiting a likelihood of engaging the field 270.

However, in some circumstances, while the controller 278 operates the agricultural system 100 in the non-harvesting mode, it may be desirable to move at least a portion of the header 200. By way of example, the agricultural system 100 may encounter an obstacle while operating in the non-harvesting mode. Accordingly, the controller 278 may be configured to instruct the header 200 to move in the non-harvesting mode and avoid the obstacle. In this manner, the profile of the header 200 illustrated in FIG. 4 may be considered a default or preset non-harvesting profile of the header 200 in the non-harvesting mode, in which the controller 278 may instruct the header 200 to move to the default non-harvesting profile upon or in response to initialization of the non-harvesting mode. However, while the agricultural system 100 operates in the non-harvesting mode, the controller 278 may instruct the header 200 to move and deviate from the default non-harvesting profile, as will be further described below.

Figure 5:
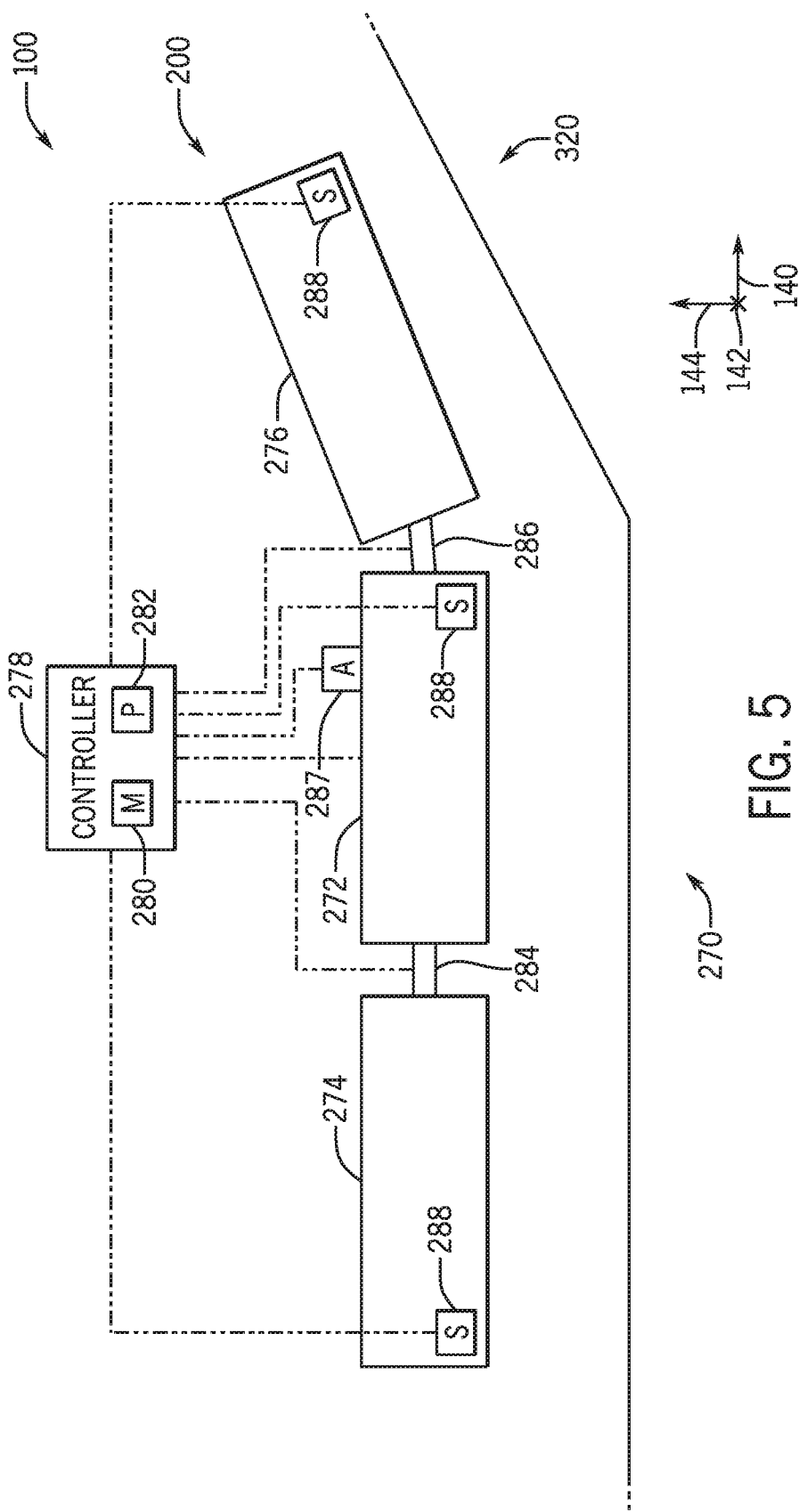
FIG. 5 is a schematic diagram of an embodiment of the agricultural system of FIG. 1 operating in a non-harvesting mode, and in which a lateral section has been moved relative to a center section, in accordance with an aspect of the present disclosure.

With this in mind, FIG. 5 is a schematic diagram of an embodiment of the agricultural system 100 operating in a non-harvesting mode, in which the second lateral section 276 has been moved relative to the center section 272. For example, the field 270 may have a first raised portion 320, such as a hill. The position of the second lateral section 276 relative to the center section 272 in the default non-harvesting profile of the header 200, as illustrated in FIG. 4, may cause the second lateral section 276 to contact the first raised portion 320. For this reason, the controller 278 may output a control signal to instruct the second actuator 286 to raise the second lateral section 276 relative to the center section 272 so as to avoid contacting the first raised portion 320. In the illustrated embodiment, a remainder of the header 200 (e.g., the center section 272 and/or the first lateral section 274) may remain in respective positions corresponding to the default non-harvesting profile of the header 200. In other words, the controller 278 instructs the header 200 to move only the second lateral section 276 away from the default non-harvesting profile of the header 200.

In some embodiments, the controller 278 may be configured to instruct the header 200 to deviate from the default non-harvesting profile based on sensor feedback received from the sensors 288. As an example, in the non-harvesting mode, the sensors 288 may detect that a distance between the first raised portion 320 and the second lateral section 276 is below a distance threshold (e.g., 1 meter, 1.5 meters, 2 meters, 2.5 meters, 3 or more meters). In response, the controller 278 may instruct the second actuator 286 to raise the second lateral section 276. In certain embodiments, the controller 278 may instruct the second actuator 286 to continue to raise the second lateral section 276 until the distance between the first raised portion 320 and the second lateral section 276 exceeds the distance threshold. In additional or alternative embodiments, the controller may instruct the second actuator to raise the second lateral section to a target position, which may be based on the initially detected distance between the second lateral section and the first raised portion. As another example, the controller may receive a user input during the non-harvesting mode, and the user input may indicate that the second lateral section is to be moved. That is, for instance, the operator may observe that the upcoming path of the agricultural system includes the first raised section and, in response, the operator may transmit the user input to move the second lateral section. As such, the operator may also be able to cause the header to deviate from the default non-harvesting profile while in the non-harvesting mode (e.g., while the header is in the raised position relative to the field). Although the illustrated embodiment shows that the header 200 is moved to avoid a contour of the field 270, in additional or alternative embodiments, the header may be moved to avoid another obstacle, such as debris, a feature of an ambient environment (e.g., a tree), and so forth. In further embodiments, the header may be moved in any suitable manner in the non-harvesting mode, including lowering any of the lateral sections, moving the entirety of the header relative to the field, and the like. Further still, while the illustrated embodiment includes actuators 284, 286 that drive rotation of the lateral sections 274, 276 relative to the center section 272, the actuators 284, 286 may drive the lateral sections 274, 276 in other manners, such as sliding in a horizontal and/or vertical direction relative to the center section 272.

In some circumstances, it may be desirable to tilt the entirety of the header 200 relative to the field 270. For example, the field 270 may have another raised portion that is higher than the first raised portion and, as a result, a determination may be made that the profile of the header 200 illustrated in FIG. 5 may cause the second lateral section 276 to contact the field 270. However, the second lateral section 276 may be at an upper position limit (e.g., maximum) relative to the center section 272. That is, the second lateral section 276 may not be further raised relative to the center section 272. Accordingly, the header 200 may be tilted in order to move the second lateral section 276 farther away from the field 270 to avoid contacting the field 270.

With this in mind, FIG. 6 is a schematic diagram of an embodiment of the agricultural system 100 operating in a non-harvesting mode, in which the center section 272 has been rotated relative to the chassis of the agricultural system and the field 270 via the actuator 287. The illustrated field 270 may have a second raised portion 340, which may be higher than the first raised portion 320 shown in FIG. 5. Accordingly, in the illustrated embodiment, in addition to raising the second lateral section 276 relative to the center section 272, the center section 272 and therefore the lateral sections 274, 276 may also be tilted relative to the field 270 in order to move the second lateral section 276 further away from the second raised portion 340. For instance, the center section 272 may be rotated in a rotational direction 342 relative to the field 270 while the position of the second lateral section 276 relative to the center section 272 remains raised in the upper position limit. As such, the second lateral section 276 is moved away from the second raised portion 340 and avoids contacting the second raised portion 340.

In the illustrated profile of the header 200, the position of the first lateral section 274 relative to the center section 272 is maintained at a section position as compared to the non-harvesting profile of the header in FIGS. 4 and 5. That is, the first lateral section 274 may remain substantially level with respect to the center section 272. However, in additional or alternative embodiments, the first lateral section may also be moved relative to the center section as a result of rotation of the center section. For instance, rotation of the center section may move the second lateral section away from the second raised portion, but may move the first lateral section toward the field. As a result, the distance between the field and the first lateral section may be below the distance threshold. In response, the first lateral section may be moved relative to the center section to move away from the field, thereby avoiding contact between the first lateral section and the field.

Further still, in certain embodiments, the entirety of the header may be raised or lowered relative to the field via the actuator 287. By way of example, in addition to or as an alternative to raising one of the lateral sections relative to the center section and/or rotating the center section relative to the field, the center section may be moved along the vertical axis, thereby moving the lateral sections along the vertical axis as well.

FIG. 7 is a block diagram of an embodiment of a method 360 for operating the agricultural system in the non-harvesting mode. The steps of the method 360 may be performed by a controller, such as the controller 278 of FIGS. 3-6. As an example, the method 360 may be performed during operation of the agricultural system. Additionally, operation of the agricultural system in the non-harvesting mode may be performed differently than the method 360 illustrated in FIG. 7. For instance, additional steps may be performed and/or certain steps of the method 360 may be removed, modified, and/or performed in a different order.

At block 362, an indication of operation in the non-harvesting mode is received. In some embodiments, the indication may be a user input from the operator of the agricultural system. For example, the operator may desire to operate the agricultural system in the non-harvesting mode (e.g., after harvesting the field) and may manually send the user input. Additionally or alternatively, the indication may include sensor feedback. By way of example, the sensor feedback may indicate certain operating parameters, such as operating parameters associated with a time of operation, a location of the agricultural system (e.g., relative to a pre-planned path of operation), an operating condition of one of the components of the agricultural system (e.g., the engine is operating at a low level), another suitable operating parameter, or any combination thereof. In any case, as a result of receiving the sensor feedback, the agricultural system may initialize the non-harvesting mode.

At block 364, upon initializing the non-harvesting mode, the header of the agricultural system may be set and/or oriented into a set profile, which may include the default or preset non-harvesting profile as described above, or any other suitable profile (e.g., a user-defined profile selected or set by the user) upon initialization of the non-harvesting mode. Thus, the set profile may include a raised position of the header relative to the field and may also include a leveled profile or configuration, which may include a generally straightened orientation of the sections of the header relative to one another. However, the set profile may additionally or alternatively include any suitable positioning of the header relative to the field and any suitable profile of the header (e.g., a U-shape).

At block 366, sensor feedback indicative of an obstacle position relative to the header is received. For instance, a sensor may detect that a particular obstacle (e.g., the field and/or debris) is proximate to the header. Thus, the sensor feedback may indicate that a distance between the header and the particular obstacle is below a distance threshold. Additionally or alternatively, the sensor may detect that the particular obstacle has contacted the header. Thus, the sensor feedback may indicate that a particular object is exerting a force onto the header and/or causing the header to bend, for example.

In response, a signal may be transmitted to set a positioning of the header based on the sensor feedback, as indicated at block 368. That is, a section of the header may be moved away from the particular obstacle to avoid contacting the obstacle and/or to block the particular obstacle from further contacting the header (e.g., to exert additional force or cause additional bending of the header). By way of example, the section of the header may be raised or lowered relative to a remainder of the header, the entirety of the header may be tilted or rotated relative to the field (e.g., by tilting the center section), the entirety of the header may be raised or lowered relative to the field (e.g., by raising or lowering the center section), or any combination thereof. The set position may increase the distance between the header and the field, thereby reducing a likelihood or an extent in which the header comes into contact with the obstacle.

In some circumstances, the header may be positioned such that the header is at a position limit, such as a maximum raised position, a minimum lowered position, and the like, but the distance between the header and the obstacle may still remain below the distance threshold. In other words, the header is positioned to move the section of the header to the position limit away from the obstacle, but the sensor may determine that the obstacle position is still proximate to the header. Accordingly, the header may not be able to be further moved to avoid contacting the obstacle position. In response, a notification may be sent to indicate that the section of the header may no longer be moved, but that the obstacle is still located proximate to the header. For instance, the indication may be an alarm or a flag sent to the operator, and the operator may perform a corrective action accordingly (e.g., changing the path of the agricultural system to avoid the obstacle).

At block 370, additional sensor feedback is received, and the additional sensor feedback may be indicative of an additional obstacle position (e.g., an update of the obstacle position received at block 366) relative to the header. For instance, the additional sensor feedback may indicate that the distance between the header and the obstacle may be greater than the distance threshold. That is, the sensor may detect that the obstacle is no longer positioned proximate to the header. Additionally or alternatively, the additional sensor feedback may indicate that the obstacle is no longer contacting the header.

As a result, an additional signal may be output to set the positioning of the header toward the set profile, as shown at block 372. That is, the positioning of the header may be moved to or toward the default or preset non-harvesting profile in which the header was set during initialization of the non-harvesting mode. In this manner, the deviation between a current profile of the header and the default or preset non-harvesting profile of the header is reduced.

In certain embodiments, the steps of the method 360 may be iteratively performed during operation of the agricultural system. As an example, the header may continuously deviate from the default or preset non-harvesting profile until the distance between the header and the obstacle is at or above the distance threshold. Furthermore, the header may be continuously moved to return to or toward the default or preset non-harvesting profile when the distance between the header and the obstacle is above the distance threshold. Thus, the distance between the header and the field may continuously be maintained at or above the distance threshold.

In further embodiments, the agricultural system may be configured to change operation from the non-harvesting mode to operation in the harvesting mode. For instance, the agricultural system may receive an indication to operate in the harvesting mode, such as in response to receiving a user input, receiving sensor feedback, and so forth. In response, the agricultural system may lower the entirety of the header from the profile associated with the non-harvesting mode so as to follow the contour of the field to harvest the crops in the field more effectively. Indeed, the agricultural system may alternate between operating in the harvesting mode and in the non-harvesting mode, and the agricultural system may move the header relative to the field accordingly.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C.

The invention claimed is:

1. An agricultural system, comprising:
a header; and
a controller configured to:
receive an indication to operate the agricultural system in a non-harvesting mode;
output a first signal to set the header in a set profile upon initialization of the non-harvesting mode;
receive sensor feedback indicative of an obstacle position of an obstacle relative to the header while the agricultural system operates in the non-harvesting mode; and
output a second signal to adjust the header to deviate from the set profile based on the sensor feedback while the agricultural system operates in the non-harvesting mode.

2. The agricultural system of claim 1, wherein the sensor feedback is indicative that a distance between the obstacle and a portion of the header is below a distance threshold.

3. The agricultural system of claim 1, wherein the controller is configured to output a third signal to move the header to a non-harvesting position relative to a field upon initialization of the non-harvesting mode, to receive another indication to operate the agricultural system in a harvesting mode, and to output a fourth signal to move the header to a harvesting position relative to the field upon initialization of the harvesting mode, wherein the header is positioned closer to the field while in the harvesting position as compared to in the non-harvesting position.

4. The agricultural system of claim 1, wherein the header comprises a first section and a second section, and the first signal, the second signal, or both are configured to cause the first section and the second section to move relative to one another.

5. The agricultural system of claim 4, wherein the sensor feedback is indicative of the obstacle position relative to the second section, and the controller is configured to maintain a section position of the first section and the second signal is configured to cause the second section to move relative to the first section in response to receiving the sensor feedback.

6. The agricultural system of claim 4, comprising an actuator coupling the first section to the second section, wherein the second signal instructs the actuator to move the first section and the second section relative to one another.

7. The agricultural system of claim 1, comprising a sensor communicatively coupled to the controller and configured to transmit the sensor feedback to the controller, wherein the sensor is a contact sensor, a non-contact proximity sensor, or both.

8. A non-transitory computer readable medium comprising executable instructions that, when executed by a processor, are configured to cause the processor to:
operate an agricultural system in a harvesting mode;
receive an indication to operate the agricultural system in a non-harvesting mode;
output a first signal to raise a header of the agricultural system relative to a field and relative to a harvesting position of the header in the harvesting mode in response to receiving the indication to operate the agricultural system in the non-harvesting mode;
output a second signal to orient the header based on a set profile upon initialization of the non-harvesting mode;
receive sensor feedback indicative of an obstacle position of an obstacle relative to the header while the agricultural system operates in the non-harvesting mode; and
output a third signal to set a header position of the header based on the sensor feedback while the agricultural system operates in the non-harvesting mode, wherein the header position is different from the set profile.

9. The non-transitory computer readable medium of claim 8, wherein the instructions, when executed by the processor, are configured to cause the processor to:
determine a distance between the obstacle and a section of the header is below a distance threshold based on the sensor feedback; and
output the third signal to adjust the section of the header such that the distance between the obstacle and the section of the header is at or above the distance threshold.

10. The non-transitory computer readable medium of claim 9, wherein the instructions, when executed by the processor, are configured to cause the processor to:
determine the distance between the obstacle and the section of the header is above the distance threshold based on the sensor feedback; and
output a fourth signal to adjust the section of the header to return toward the set profile in response to the distance between the obstacle and the section of the header being above the distance threshold.

11. The non-transitory computer readable medium of claim 8, wherein the indication to operate the agricultural system in the non-harvesting mode is received from a user input, from sensor feedback, or both.

12. The non-transitory computer readable medium of claim 8, wherein the instructions, when executed by the processor, are configured to cause the processor to:
receive an additional indication to operate the agricultural system in the harvesting mode; and
output a fourth signal to lower the header relative to the field and relative to a non-harvesting position of the header in the non-harvesting mode in response to receiving the additional indication to operate the agricultural system in the harvesting mode.

13. The non-transitory computer readable medium of claim 12, wherein the instructions, when executed by the processor, are configured to cause the processor to output the third signal to set the header position of the header based on the sensor feedback by raising the header, lowering the header, tilting the header, or any combination thereof.

14. An agricultural system, comprising:
a header comprising a first section and a second section; and
a controller configured to:
operate the agricultural system in a harvesting mode or a non-harvesting mode:
output a first signal to position the header at a harvesting position that enables the header to harvest a field in the harvesting mode;
output a second signal to set a first position of the first section and a second position of the second section based on a set profile upon initialization of the non-harvesting mode;
receive sensor feedback indicative of an obstacle position of an obstacle relative to the header in the non-harvesting mode; and output a third signal to adjust the first section, the second section, or both based on the sensor feedback in the non-harvesting mode.

15. The agricultural system of claim 14, wherein the set profile comprises a non-harvesting position, and the non-harvesting position is raised relative to the field as compared to the harvesting position.

16. The agricultural system of claim 14, wherein the set profile comprises a leveled configuration of the first section relative to the second section.

17. The agricultural system of claim 14, wherein the second section extends from the first section, and the agricultural system comprises a third section extending from the first section opposite the second section.

18. The agricultural system of claim 17, wherein the controller is configured to output a fourth signal to adjust a third position of the third section relative to the first section, and the third signal and the fourth signal are output independently of one another.

19. The agricultural system of claim 14, wherein the controller is configured to transition between operating the agricultural system in the harvesting mode and operating the agricultural system in the non-harvesting mode in response to receiving an indication.

20. The agricultural system of claim 14, wherein the third signal causes the first section to deviate from the first position of the first section of the set profile.

* * * * *